Jan. 26, 1960  H. SCHOEPE  2,922,327
CONTOUR FOLLOWER APPARATUS
Filed March 13, 1956  4 Sheets-Sheet 2
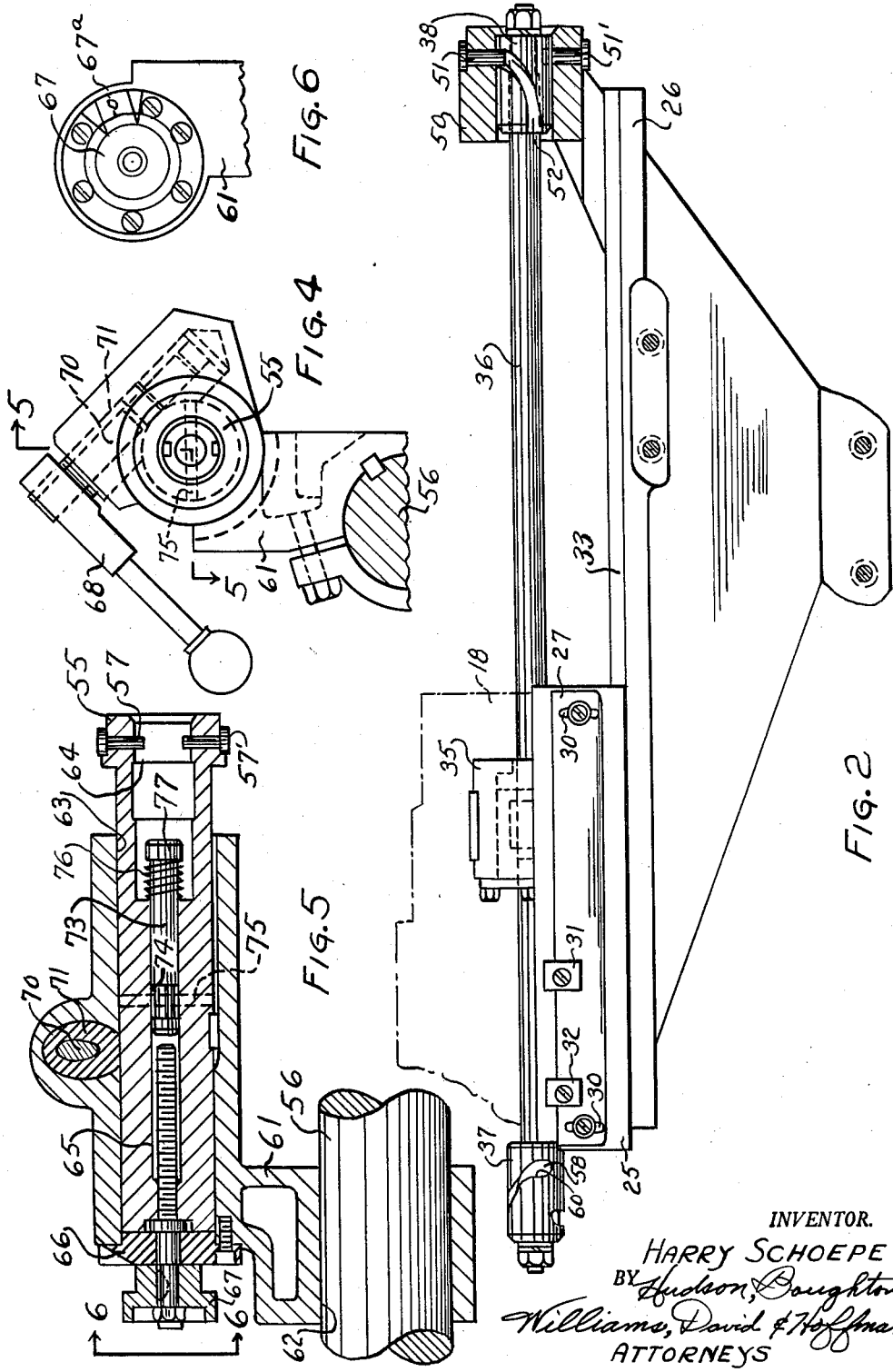
INVENTOR.
HARRY SCHOEPE
ATTORNEYS Jan. 26, 1960 H. SCHOEPE 2,922,327
CONTOUR FOLLOWER APPARATUS
Filed March 13, 1956 4 Sheets-Sheet 3
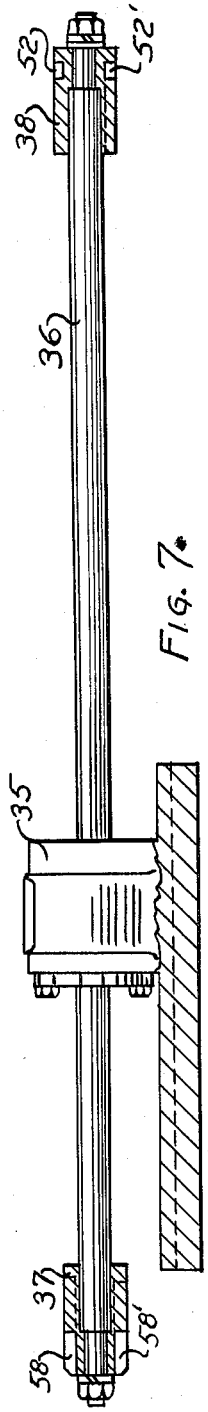
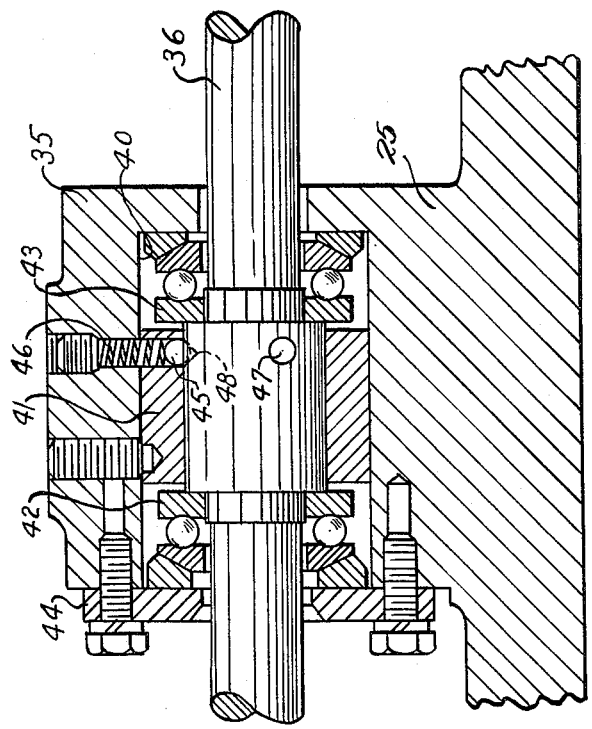
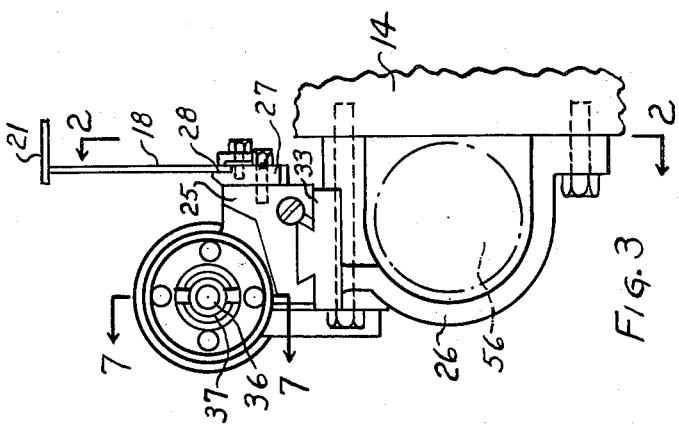
INVENTOR.
HARRY SCHOEPE
BY Hudson, Boughton,
Williams, David & Hoffmann
ATTORNEYS

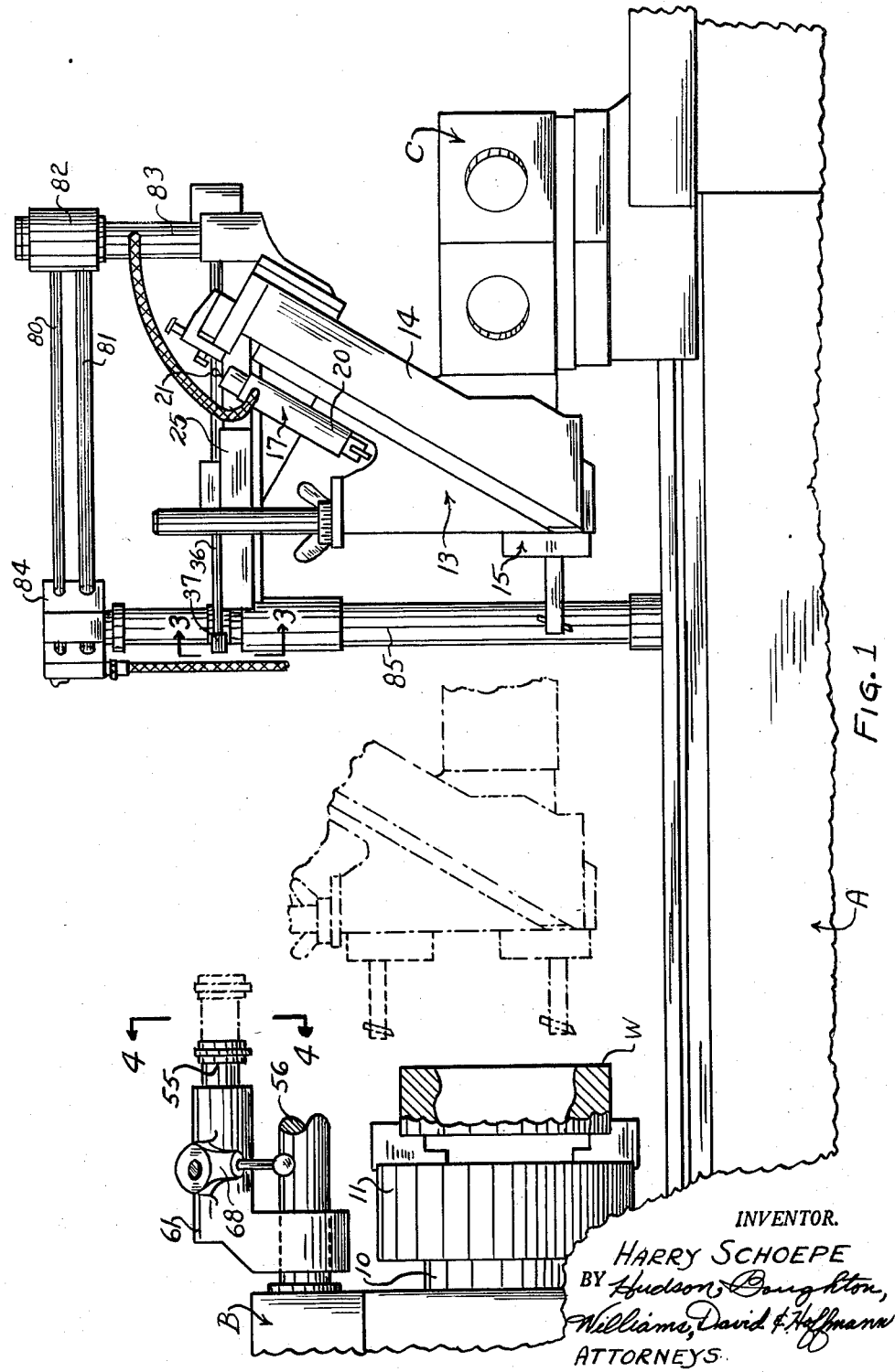

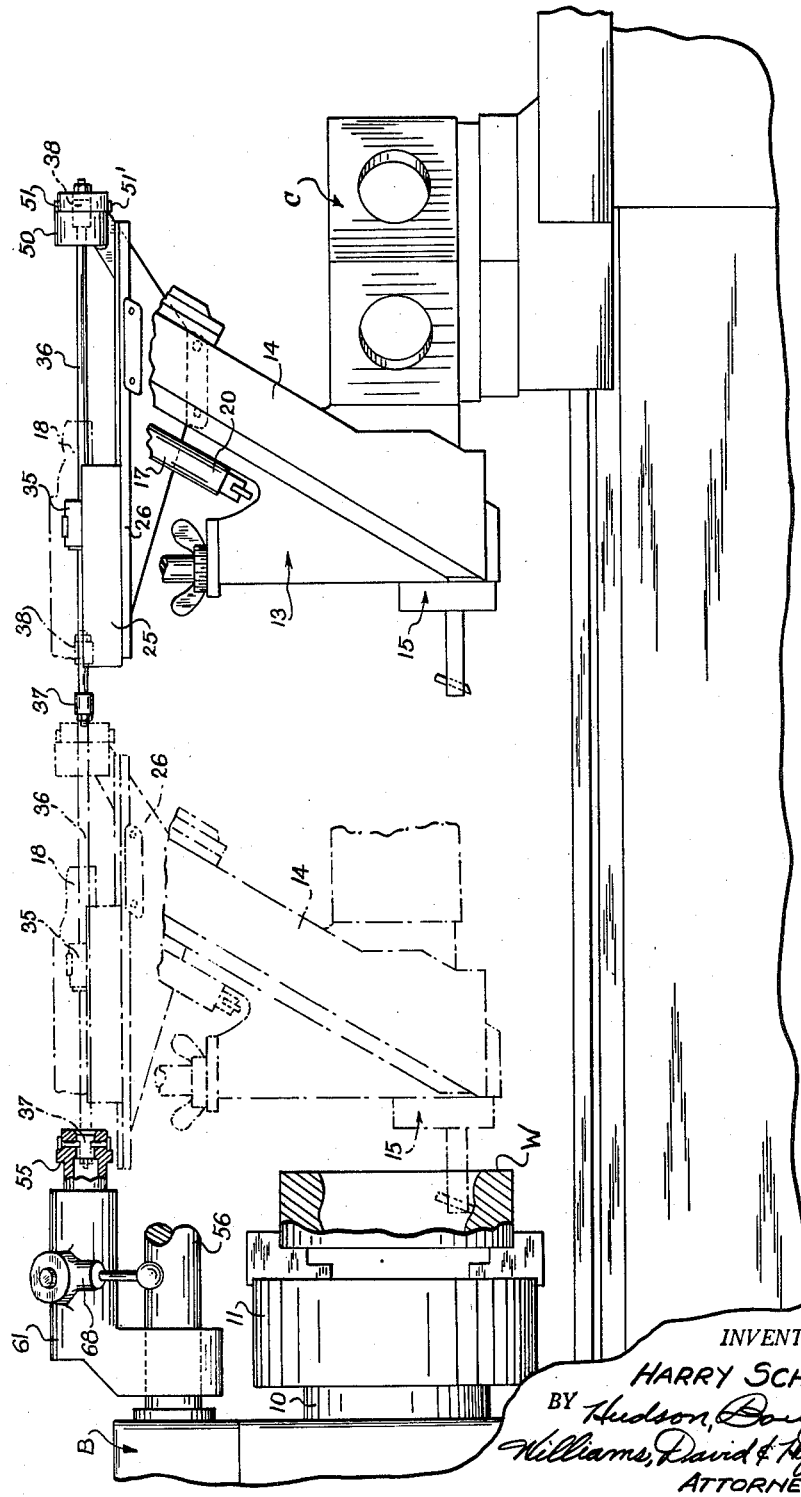

United States Patent Office 2,922,327
Patented Jan. 26, 1960

2,922,327

CONTOUR FOLLOWER APPARATUS

Harry Schoepe, Cleveland, Ohio, assignor to The Warner & Swasey Company, Cleveland, Ohio, a corporation of Ohio Application March 13, 1956, Serial No. 571,167

5 Claims. (Cl. 82—14)

The present invention relates to machine tools and, more particularly, to machine tools having duplicating mechanism for machining a workpiece in accordance with a pattern supported on the machine tool.

The principal object of the present invention is to provide a new and improved machine tool, particularly a saddle-type turret lathe, in which a pattern for controlling a duplicating mechanism is supported by a first one of two relatively movable supports and is releasably connected to the first support so as to prevent relative movement therebetween and is automatically connected to the second support and released from the first support to cause relative movement between the pattern and the first support upon relative movement between the first and second supports.

Another object of the present invention is to provide a new and improved machine tool, particularly a saddle-type turret lathe, in which a pattern for controlling a duplicating mechanism is supported by a first one of two supports relatively movable in feed and return directions and is releasably connected to the first support so as to be stationary with respect thereto, and upon a predetermined relative feed movement is automatically connected to the second support and released from the first support for relative movement in a first direction between the pattern and the first support upon continued relative feed movement between the first and second supports, and is automatically released from the second support and again connected to the first support upon relative movement in a second direction opposite the first direction between the pattern and the first support.

Another object of the present invention is to provide a new and improved saddle-type turret lathe, in which a contouring pattern is carried by an indexible turret which is movable to effect a relative feed movement and is automatically connected to a stationary part of the lathe and released from the turret so as to permit relative movement therebetween upon movement of the turret to a predetermined position, and upon return movement of the turret is, upon the latter reaching a predetermined position, automatically released from the stationary part and again connected to the turret for movement therewith; and in which the pattern is indexible with the turret so as to move the pattern to an out-of-the-way position when not in use.

The invention resides in certain constructions and combinations and arrangements of parts and further objects and advantages thereof will be apparent from the following detailed description of the preferred embodiment made with reference to the accompanying drawings, forming a part of this specification, in which:

Fig. 1 is a fragmentary front elevational view of a saddle-type turret lathe embodying the present invention;

Fig. 2 is a view of the pattern-holding means of the machine of Fig. 1 looking approximately along line 2—2 of Fig. 3;

Fig. 3 is a fragmentary elevational view looking approximately from line 3—3 of Fig. 1;

Fig. 4 is a view looking from line 4—4 of Fig. 1;

Fig. 5 is a sectional view taken approximately along line 5—5 of Fig. 4;

Fig. 6 is an end elevational view looking from line 6—6 of Fig. 5;

Fig. 7 is a view taken approximately along line 7—7 of Fig. 3 with parts thereof in elevation;

Fig. 8 is an enlarged vertical sectional view of the support for the stay rod shown in Fig. 7; and Fig. 9 is a view similar to Fig. 1 but certain parts thereof omitted and other parts cut away.

While the present invention is susceptible of various modifications and constructions and of use with various types of machine tools, it is particularly advantageous when used with a machine tool in which the pattern for controlling a contouring mechanism is to be supported on a member which is movable to effect a relative feed movement between the tool and the workpiece, and in which the member supporting the pattern is indexible in order to present different tools to the workpiece. The preferred embodiment of the present invention illustrated in the drawings is a saddle-type turret lathe having a pattern and contouring mechanism supported on the indexible saddle-type turret of the lathe.

Referring to the drawings, the saddle-type turret lathe illustrated therein comprises a bed A, a headstock B, and a saddle-type turret C which is movable longitudinally of the bed A to effect a relative feed movement between the turret and the headstock by conventional power means, not shown in the drawings. The headstock B includes a work spindle 10 for rotating a workpiece W and a workholding chuck 11 on the spindle for securing the workpiece to the spindle. In the illustrated embodiment, the workpiece W is an annular workpiece which is to have its inside diameter turned to a desired configuration.

In the preferred embodiment, the turret C is an indexible turret having a contouring tool slide 13 mounted thereon. The tool slide 13 is supported for movement transversely of the axis of the workpiece W by a base member 14 which is secured to one of the faces of the hex turret C. A toolholder 15 is mounted on the tool slide 13 and is moved transversely of the axis of the workpiece W along with the slide 13.

The contouring tool slide 13 includes a contouring mechanism 17 cooperating with and transversing a pattern 18 as the hex turret C is moved relative to the workpiece W and for controlling the movement of the tool slide 13 in accordance with the configuration of the pattern 18. The mechanism 17 may be of any suitable construction or type and, in the illustrated embodiment, includes a control valve 20 which is operated by a stylus 21 that engages and follows the contour of the pattern 18 to cause the operation of a fluid pressure cylinder, not shown, operatively connected between the tool slide 13 and the base member 14 to maintain the stylus 21 in a predetermined relationship with respect to the pattern 18 and the tool slide 13. Since the contouring mechanism per se forms no part of the present invention it will not be described in detail and it will be understood that any suitable contouring mechanism may be substituted for that shown.

In the illustrated embodiment the pattern 18 which controls the operation of the contouring mechanism 17 is carried by the turret C. The pattern is mounted on a slide member 25 supported on a bracket 26 fixed to the rearward side of the base member 14 adjacent the upper end thereof. The forward face of the slide member 25 has mounted thereon a vertical plate 27 which is recessed along its upper forward edge as indicated at 28, to provide a recessed portion for receiving the pattern 18, see Fig. 3. The plate 27 is bolted to the slide member 25 and has elongated holes 30 therein for passing the bolts and for permitting adjustment of the plate in a vertical direction. The plate 27 is provided with clamp members 31, 32 for clamping the pattern in the recessed portion 28.

The slide member 25 is slidably supported by horizontal ways 33 formed on the bracket 26, which ways permit relative movement between the slide member 13 and the bracket 26 parallel to the relative feed movement between the turret and the workpiece. The slide member 25, however, will move with the bracket 26 and the turret C unless positively prevented from doing so.

According to the present invention the slide member 25 moves with the bracket 26 and the turret C until the turret C reaches a predetermined position in its feed movement, at which time the slide member 25 is released from the bracket 26 for relative movement with respect thereto and is simultaneously connected to the headstock B so as to be stationary with respect thereto. To this end, the slide member 25 is provided adjacent its rearward side with a boss 35 which rotatably supports a stay rod 36 having cam members 37, 38, respectively, at its opposite ends for connecting the stay rod to the headstock B and to the bracket 26 respectively, see Figs. 2 and 5. The stay rod 36 is supported in an axial bore 40 in the boss 35 and has a shouldered bearing portion rotatably supported therein by a bushing type bearing 41 which is positioned centrally of the length of the bore. Thrust bearings 42, 43 are provided for the stay rod 36 and are respectively located in the bore 40 on opposite sides of the bushing-type bearing 41 in contact with the shoulders of the bearing portion of the stay rod. The bore 40 is closed at its right-hand end, as viewed in Fig. 8, by a wall which is formed integral with the boss, and at its left-hand end by a plate 44 bolted to the boss 35. The stay rod 36 is rotated between two different angular positions and the bearing 41 and the boss 35 are provided with aligned detents and bores for supporting a detent ball 45 and biasing spring 46 which tend to hold the stay rod 36 in the angular position in which it is immediately positioned. The detent ball 45 is received in either one of two angularly spaced detents or recesses 47, 48 in the bearing portion of the stay rod.

Prior to the feed movement of the turret C and the positioning of the tool supported in the tool holder 15 in cutting relationship with the workpiece, the stay rod 36 and, in turn, the slide member 25 are connected to the bracket 26 by the cam member 38. The cam member 38 is received within a socket 50 fixed to the bracket 26 and having a pin or cam follower 51 which engages a cam track 52 of the cam member 38. The cam track 52 is, in the illustrated embodiment, a curved slot which begins at a point adjacent the inner end of the cam member 38 and extends helically in a counterclockwise direction, as viewed from the inner end of the cam member 38. The cam track, at its inner end, is generally parallel with the rod 36, and at its outer end extends transversely of the cam member 38 and the rod 36. It will be understood by those skilled in the art, that when the pin or cam follower is positioned in the outer end portion of the track 52, relative axial movement between the socket 50 and the cam member 38 and, in turn, the stay rod 36, will be prevented unless the rod 36 is also rotated to permit the cam follower to move along the cam track 52. If the stay rod 36 is rotated as thus described and the rod moved relative to the bracket 26 in an axial direction or permitted to move axially in a direction to the right, as viewed in Fig. 2, the cam member 38 will disengage itself from the socket 50. Similarly, after the cam member 38 is disengaged from the socket 50 it can be reengaged by moving the stay rod 36 to the left, as viewed in Fig. 2, and permitting it to rotate so that the pin or cam follower 51 will follow the track 52.

Preferably, as viewed in the drawings, the socket 50 is provided with two pins or cam followers, the second pin being designated as 51′, and the cam member 38 with two cam tracks, the second cam track being designated by the reference numeral 52′.

Upon a predetermined movement of the turret C toward the workpiece W, and before the tool slide 13 reaches its cutting position, the cam member 37 on the left-hand end of the stay rod 36, as viewed in the drawing, enters a socket 55 carried by a bracket which is supported on a conventional pilot bar 56 which extends outwardly from the headstock B parallel to the axis of the work spindle 10. The socket 55 has a radially extending pin or cam follower 57 therein which engages a curved cam groove or track 58 formed in the cam member 37. The end portion of the cam track 58, at the left-hand end of the cam member 37, is parallel to the stay rod 36 and the track curves in a clockwise direction, as viewed from the left-hand end of the cam member 37, and terminates in a straight end portion 60 which extends transversely of the stay rod 36. Preferably, as shown in the drawing, there are two radial pins carried by the socket member 55 and two cam tracks, the second pin and second cam track being designated by the reference numerals 57′ and 58′ respectively. It will be understood by those skilled in the art that when the pins 57, 57′ engage the cam tracks 58, 58′ and the stay rod 36 is moved axially to cause the cam member 37 to enter the socket member 55, the stay rod 36 will be rotated in a counterclockwise direction, as viewed from the left side of Fig. 2. It will be noted that the direction of rotation of the stay rod 36, due to its entering the socket 55, is that direction which is necessary to cause the pin 51 and pin 51′ to move along their cam tracks 52, 52′ in a direction to release the connection between the cam member 38 and the socket member 50. Therefore, as the cam member 37 enters the socket member 55 due to the relative movement between the turret C and the headstock B, the pins 57, 57′ will cause rotation of the stay rod 36 and the release of the pins 51, 51′ from the cam tracks 52, 52′, thereby permitting relative movement in a feed direction between the bracket 26 and the turret C, on one hand, and the slide member and the pattern 18 on the other hand. When the cam member 37 has moved sufficiently into the socket member 55 for the pins 57, 57′ to ride onto the straight portions 60, further axial movement of the rod 36, with respect to the headstock B, will be prevented and relative movement will occur between the slide member 25 and the bracket 26, as the turret C is moved in a feed direction through a machining operation.

Upon completion of the machining operation, the turret C is moved in a return direction, the slide member 25 remaining stationary with respect to the headstock B and moving relative to the turret C until the turret has moved sufficiently in the return direction for the pins 51, 51′ to reengage the cam tracks 52, 52′. Upon continued return movement of the turret from this point, the pins 51, 51′ and cam tracks 52, 52′ will cause the stay rod 36 to rotate in the direction necessary to release the pins 57, 57′ from the cam tracks 58, 58′, and for the pins 51, 51′ to travel along the cam tracks 52, 52′ until they reach the end portion of the cam track which extends transversely of the stay rod 36, at which time the stay rod 36, the slide member 25, and the pattern 18 will move as a unit with the turret C upon continued movement in a return direction.

The socket member 55, as stated above, is supported from the pilot bar 56 by a bracket 61 which is clamped thereto, said bracket having a bore 62 for passing the pilot bar 56, and a bore 63 in which the socket member 55 is positioned. The socket member 55 is a cylindrical member having an aperture 64 opening into its right-hand end, as viewed in Fig. 5, for receiving the cam member 37 and is keyed in the bore 63 to permit axial adjustment with respect thereto. The socket member 55 is adjusted axially with respect to the bore 63 by a lead screw which threads into the left-hand end of the socket member 55, as viewed in Fig. 5, and which is rotatably supported in an end plate 66 closing the left-hand end of the bore 63. The outer end of the lead screw 65 is provided with a knob 67 which is rotated by the operator to move the cylinder member 55 axially in the bore 63. Indicia on the knob 67 and a zero line 67a are provided to facilitate the use of the knob to adjust the relationship between the tool and pattern when the cam 37 is in socket member 55.

After the cylinder member has been properly positioned in the bore 63 to adjust the point of contact of the pin 57 with the cam member 37, the socket member is clamped against movement from the position by the operation of a handle 68. The handle 68 operates a right and left-handed screw 70 extending transversely of, but to one side of the bore 63 and operable to cause a pair of clamp members 71 each threaded onto an oppositely threaded portion of the screw to move into engagement with the socket member 55 and to clamp the same so as to prevent axial movement thereof.

When the cam member 37 is inserted into the aperture 64 of the socket member 55, it strikes a plunger 73 positioned coaxially in the bottom of the socket and limitedly movable with respect thereto in an axial direction. The plunger 73 has a portion extending inwardly from the bottom of the aperture 64 which portion is provided with a slot 74 for passing a pin 75 for limiting the axial movement of the plunger. The pin 75 is carried by the socket member 55. A spring 76 is positioned between the bottom of the socket aperture 64 and the inner shoulder of a head 77 on the plunger and biases the plunger in an outward direction with respect to the socket aperture 64. The spring-biased plunger 73 operates to maintain the inner or transverse portion of the cam track 58 in engagement with the pin 57 and eliminates the adverse effect of play between the cam track and the pin.

The above described construction permits the pattern 18 to be carried conveniently by the base member 14 so that the pattern is indexible with the turret to move the tool slide and the pattern to an out-of-the-way position and to present a tool supported on a different face of the turret to the workpiece W. When the turret is then indexed to again return the contouring tool slide 13 to a position for operating on the workpiece W, the pattern 18 is moved into position along with the tool slide and relative movement between the pattern and the contouring tool slide 13 is caused when the cam member 37 engages the socket member 55 to lock the pattern slide-holding member 25 to the headstock and to release the latter from the turret C. The contouring tool slide 13, the base member 14, and the bracket 26 may be constructed as an attachment for the lathe and provide a convenient construction for maintaining a predetermined relationship between the following mechanism 17 and the pattern 18. Since the pattern 18 is always mounted on the base member 14 along with the contouring tool slide 13, the problem of maintaining the proper relationship between the following mechanism and the pattern is greatly simplified.

Any suitable means may be used to provide fluid pressure to the duplicating tool slide 13 when the tool slide is hydraulically operated, as in the illustrated embodiment. In the machine shown in the drawings, fluid pressure is supplied to the duplicating tool slide through pipes 80, 81 which terminate in a rotatable head 82 carried by a post 83 fixed to the upper end of the base member 14 and which pass through a rotatable head 84 supported on a stationary post 85. The head 84 is constructed so that the pipes 80, 81 may slide axially with respect thereto as the turret C is moved longitudinally of the bed A. Fluid pressure connections from, and to, the pipes 80, 81 may be made by suitable flexible conduits.

It can now be seen that the present invention provides a machine tool, particularly a saddle-type turret lathe, having first and second support members which are relatively movable to effect a relative feed movement between a tool and workpiece, and in which a pattern for controlling movements between the tool and workpiece in a direction angularly related to the relative feed movement is supported on the first member and is automatically connected to the second member upon a predetermined relative movement therebetween and simultaneously disconnected from the first member to the extent that relative movement in a direction parallel to the feed movement is permitted between the first member and the pattern.

While the preferred embodiment of the present invention has been described in considerable detail, further arrangements, modifications and constructions may be made without departing from the scope of the present invention, and it is hereby my intention to cover all such modifications, constructions and arrangements which fall within the ability of those skilled in the art and the scope of the appended claims.

Having thus described my invention, I claim:

1. In a machine tool having first and second support members adapted to support a tool and a workpiece to be moved relative to each other to perform a machining operation and relatively movable in feed and return movements, a pattern support member mounted on said first support member for relative movement therebetween parallel to the relative movement between said first and second support members; the improvement comprising releasable connecting means including cooperating locking elements on said pattern support member and said first support member for connecting said pattern support member to said first support member to prevent relative movement therebetween, and connecting means including cooperating locking elements on said pattern support member and said second support member engageable upon a predetermined relative movement between said first and second support member to connect said pattern support member to said second support member so as to be stationary with respect thereto, and means operated simultaneously with the engagement of last said connecting means for actuating the said releasable connecting means to release the pattern support member from the first support member to permit relative movement between said pattern support member and said first support member upon continued relative feed movement of said first and second support members.

2. In a machine tool having first and second support members adapted to support a tool and a workpiece to be moved relative to each other to perform a machining operation and relatively movable in feed and return movements, a pattern support member mounted on said first support member for movement between the pattern support member and the first support member in a first direction parallel to said relative movement; the improvement comprising cam means including cooperating cam elements on said pattern support member and said first support member for releasably connecting said pattern support member to said first support member to prevent relative movement therebetween and actuatable to effect the release of said pattern support member for relative movement with respect to said first support member, and cam means including cooperating cam elements on said pattern support member and said second support member engageable upon a predetermined relative feed movement between said first and second support members and operated in response to the engagement thereof to releasably connect said pattern support member to said second support member so as to be stationary with respect thereto and means interconnecting said cam elements of said cam means to actuate said cam means connecting said pattern support member to said first support member to release said pattern support member for relative movement between said pattern support member and said first support member upon engagement of the cam elements of the first mentioned cam means and continued relative feed movement of said first and second support members.

3. In a machine tool having first and second support members for supporting a tool and a workpiece and relatively movable to effect relative feed and return movements between the tool and workpiece, a pattern support member for supporting a pattern device mounted on said first support member for relative movement therebetween in a direction parallel to said relative feed and return movements; the improvement comprising first connecting means for connecting said pattern support member to said second support member upon a predetermined feed movement between said first and second support members comprising a cam follower and a cooperating cam member having a curved cam track engageable by the cam follower and terminating in a portion extending transversely of the direction of relative feed movement and causing relative rotation in one direction between said cam follower and said cam member upon relative translatory movement therebetween to engage the cam follower with the said terminating portion of the cam track and the cam member and cam follower being actuatable to a released position upon relative rotation and a predetermined translatory movement in the opposite direction to that required for engaging the connecting means, means mounting said cam follower and said cooperating cam member on different ones of said pattern support member and said second support member, second connecting means for connecting said pattern support member to said first support member to prevent relative movement therebetween comprising a cam follower and a cooperating cam member supported on different ones of the pattern and first support members, the last-mentioned cam member having a curved cam track engageable by the cooperating cam follower and terminating in a portion preventing relative translatory movement between the cam member and cam follower in a direction parallel to the feed movement and causing relative rotation in one direction between the cooperating cam member and cam follower upon relative movement thereof to an engaged position on relative movement between said pattern support member and said first support member in the direction opposite said predetermined direction, said cooperating cam follower and cam member of said second connecting means being releasable upon relative rotation in the opposite direction to said one direction of relative rotation thereof and relative translatory movement in a feed direction, and means interconnecting said connecting means to relatively rotate the other connecting means in a releasing direction when one of the connecting means is moved to an engaged position.

4. In a machine tool, having first and second support members adapted to support a tool and workpiece to be moved relative to each other in feed and return movements, a pattern support member mounted on said first support member for relative movement therebetween parallel to said feed and return movements from a first relative position to a second relative position to control the depth of cut during the feed movement, the improvement comprising first connecting means including first and second locking elements on said first and pattern support members, respectively, said locking elements being disposed for releasable locking engagement in response to the relative movement of said first and pattern support members to their said first relative position, third and fourth cooperating locking elements on said second and pattern support members, respectively, and disposed for releasable locking engagement with each other when said pattern and first support members are connected by said first and second locking elements and in response to relative movement between said first and second support members in a feed direction to a predetermined position, and means interconnecting said connecting means and operated on engagement of one connecting means to release the other connecting means.

5. In a machine tool as set forth in claim 4, wherein said locking elements are cam members engageable and releasable by relative transitional and rotational movement in opposite directions, respectively, and said connecting means comprises a rod interconnecting said first and second connecting means and rotated in response to the engagement of one connecting means to release the other connecting means.

References Cited in the file of this patent

UNITED STATES PATENTS

| | | |
|---|---|---|
| 1,677,131 | Cole | July 17, 1928 |
| 1,678,924 | Strindberg | July 31, 1928 |
| 1,793,718 | Price | Feb. 24, 1931 |
| 1,817,668 | Bogart | Aug. 4, 1931 |
| 1,855,930 | Stull | Apr. 26, 1932 |
| 2,257,503 | Lange | Sept. 30, 1941 |
| 2,739,495 | Johnson | Mar. 27, 1956 |
| 2,798,395 | Johnson | July 9, 1957 |